United States Patent

Cragoe, Jr. et al.

[15] 3,668,241

[45] June 6, 1972

[54] SUBSTITUTED 1-OXOINDEN-5-YLOXY ALKANOIC ACIDS

[72] Inventors: Edward J. Cragoe, Jr., Lansdale, Pa.; Otto W. Woltersderf, Jr., Chalfont, Pa.

[73] Assignee: Merck & Co., Inc., Rahway, N.J.

[22] Filed: Nov. 25, 1968

[21] Appl. No.: 778,819

[52] U.S. Cl. ............................. 260/520, 424/267, 424/308, 424/309, 424/316, 424/317, 424/319, 424/324, 424/331
[51] Int. Cl. ........................................................ C07c 65/02
[58] Field of Search ............................. 260/470, 473 F, 520

[56] References Cited

OTHER PUBLICATIONS

Topliss et al., J. Pharm. Sci. 57 No. 5 (1968) 737

Koelsch et al., J. Am. Chem. Soc., 65, 2311 (1943)

*Primary Examiner*—Lorraine A. Weinberger
*Assistant Examiner*—John F. Terapane
*Attorney*—Joseph W. Molasky, J. Jerome Behan and I. Louis Wolk

[57] ABSTRACT

(1-Oxoinden-5-yloxy)- and (1-Oxoinden-5-ylthio)-alkanoic acid products and salts, esters and amide derivatives thereof wherein the 1-oxoindenyl ring may be substituted by various radicals are disclosed. The said products are diuretic and saluretic agents. The products may be prepared by three routes: (1) via the dehydrohalogenation of a [1-oxo-2-halo-5-indanyloxy(or thio)]-alkanoic acid; (2) via the etherification of a 5-hydroxy-(or mercapto)inden-1-one; or (3) via the hydrolysis of a [1-oxoinden-5-yloxy-(or thio)]alkanoic acid ester.

8 Claims, No Drawings

SUBSTITUTED 1-OXOINDEN-5-YLOXY ALKANOIC ACIDS

This invention relates to a new class of chemical compounds which can be described generally as (1-oxoinden-5-yloxy)alkanoic acids and (1-oxoinden-5-ylthio)alkanoic acids and to the nontoxic, pharmacologically acceptable salts, esters and amide derivatives thereof. It is also an object of this invention to describe a novel method of preparation for the said (1-oxoinden-5-yloxy)alkanoic acid and (1-oxoinden-5-ylthio)alkanoic acid products and their corresponding salts, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excess of fluid levels to acceptable limits and, in general, alleviate conditions usually associated with edema.

The (1-oxoinden-5-yloxy)alkanoic acids and (1-oxoinden-5-ylthio)alkanoic acids of this invention are compounds having the following structural formula:

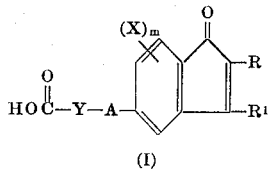

(I)

wherein Y is an alkylene or haloalkylene having a maximum of four carbon atoms and which contain from one to three linear carbon atoms between the carboxy and oxy or thio moieties embraced by the definition of A as, for example, methylene, ethylene, propylidene, isopropylidene, isobutylidene, fluoromethylene, etc.; A is oxygen or sulfur; R is lower alkyl such as methyl, ethyl, n-propyl, isopropyl, n-butyl, and the like; cycloalkyl as, for example, mononuclear cycloalkyl such as cyclopentyl, cyclohexyl and the like; mononuclear aryl such as phenyl and the like; mononuclear aralkyl, such as benzyl and the like; halo-substituted mononuclear aralkyl such as 4-chlorobenzyl and the like; or trifluoromethyl substituted lower alkyl such as 2,2,2-trifluoroethyl; $R^1$ is hydrogen, lower alkyl, such as methyl, ethyl, n-propyl, isopropyl, n-butyl, and the like; or mononuclear aryl such as phenyl, the X radicals are similar or dissimilar members selected from, halogen such as fluoro, bromo, chloro, iodo and the like, lower alkyl such as methyl, ethyl, propyl, isopropyl, n-butyl and the like, trifluoromethyl and the like or acylamino, for example, lower alkanoylamino such as acetylamino and the like and, taken together, two X radicals on adjacent carbon atoms of the benzene ring may be joined to form a hydrocarbylene chain (i.e., a divalent organic radical composed solely of carbon and hydrogen) containing from 3 to 4 carbon atoms between their point of attachment, for example, trimethylene, tetramethylene, 1,3-butadienylene (i.e., —CH = CH—CH = CH—) and the like, and m is an integer having a value of 1 to 3.

A preferred embodiment of the invention relates to the (1-oxoinden-5-yloxy)acetic acids having the following structural formula:

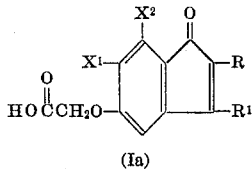

(Ia)

wherein R is lower alkyl, $R^1$ is hydrogen or lower alkyl, $X^1$ and $X^2$ represent similar or dissimilar members selected from hydrogen, halogen or lower alkyl and, taken together, may be joined to form a 1,3-butadienylene linkage (i.e., —CH = CH—CH = CH—) with the proviso that both $X^1$ and $X^2$ are not hydrogen simultaneously. The foregoing class of compounds exhibits particularly good diurectic and saluretic activity and represents a preferred subgroup of compounds within the scope of this invention.

The [1-oxoinden-5-yloxy(and thio)]alkanoic acids (I) of this invention are conveniently prepared by one or more of three alternate processes. One method of preparation comprises the dehydrohalogenation of a [1-oxo-2-halo-5-indanyloxy(or thio)]alkanoic acid; a second method consists in the etherification of a 5-hydroxy(or mercapto)-inden-1-one; and a third route comprises hydrolyzing a [1-oxoinden-5-yloxy(or thio)]alkanoic acid ester to the corresponding carboxylic acid derivative.

The first of the aforementioned processes, i.e., the dehydrohalogenation process, relates specifically to the reaction of a [1-oxo-2-halo-5-indanyloxy(or thio)]alkanoic acid (II, infra) with a dehydrohalogenating agent such as a base, preferably an organic base such as 1,5-diazabicyclo-(4.3.0)-5-nonene,1,5-diazabicyclo-(5.4.0)-undec-5-ene, pyridine, lutidine, collidine, triethylamine and the like. The solvent can be an excess of the base being used or may be any other diluent which is substantially inert to the reactants such as dimethylsulfoxide, dimethylformamide and the like. The reaction may be conducted at a temperature of from about 0° to about 150° C. for a period of from about 1 to about 8 hours; however, in most instances, the reaction is conveniently carried out at room temperature for a period of about 1 hour. The following equation illustrates the reaction:

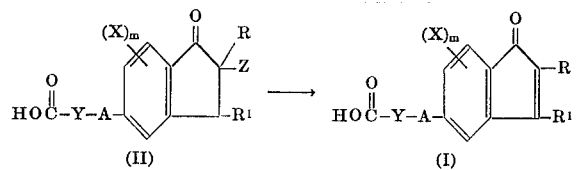

wherein A, Y, R, $R^1$, X and m are as defined above and Z is halogen such as bromo, chloro and the like. Also, it should be noted that when R is a methyl radical the dehydrohalogenating agent may be, in addition to the base given above, lithium bromide.

The second method by which the products of this invention may be prepared is by the reaction of a 5-hydroxy-(or mercapto)inden-1-one (III, infra) with a haloalkanoic acid of the formula: Z-$Y^1$-COOM, followed by treatment of the product with acid, wherein Z is as defined above, $Y^1$ is a methylene or trimethylene radical which may be approximately substituted by alkyl or fluoro and M is hydrogen or a cation derived from a metal hydroxide, alkali metal carbonate, etc., such as a sodium or potassium ion. It will be noted that inasmuch as the definition of the $Y^1$ radical is limited solely to methylene or trimethylene which may be substituted by alkyl or fluoro, the [1-oxoinden-5-yloxy(or thio)]-alkanoic acids produced by this process contain only a single carbon atom, or alternatively, three linear carbon atoms between the carbonyl and oxygen (or sulfur) group of the product (Ib). This etherification is conducted in a di-lower alkyl ketone, i.e., such as acetone and the like in the presence of a base such as potassium carbonate and the like. While temperature is not critical, it is most desirable to conduct the reaction at the reflux temperature of the particular solvent being used. The following equation illustrates this process:

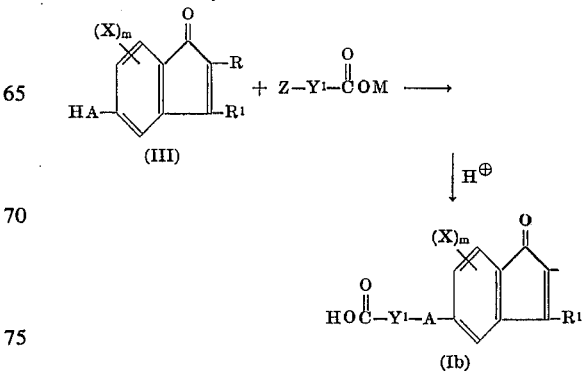

wherein A, R, R¹, X, m, M, Y¹ and Z are as defined above and H⊕ is the cation derived from a suitable organic or inorganic acid such as hydrochloric acid, acetic acid and the like.

A third method for preparing the products of this invention consists in the hydrolysis of an ester of an appropriate [1-oxoinden-5-yloxy(or thio)]alkanoic acid (IV, infra). The hydrolysis is conducted in the conventional manner by treatment of said ester with an aqueous solution of an acid, for example, with an aqueous solution of hydrochloric acid and acetic acid or, alternatively, the hydrolysis may be conducted with an aqueous solution of a base such as, for example, with an aqueous solution of sodium bicarbonate; however, when an aqueous solution of a base is employed, it is necessary to treat the carboxylate salt intermediate thus formed with an acid to obtain the desired product. The following equation illustrates this method of preparation:

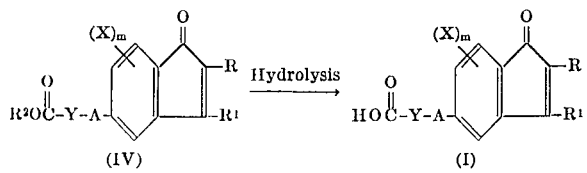

wherein A, Y, R, R¹, m and X are as defined above and R² is alkyl, for example, lower alkyl such as methyl, ethyl, n-propyl, n-butyl and the like.

The [1-oxo-2-halo-5-indanyloxy(or thio)]alkanoic acids, (II, infra) which are employed as starting materials in the aforementioned dehydrohalogenation process are prepared by the halogenation of the appropriate [1-oxo-5-indanyloxy(or thio)]alkanoic acid (V, infra) with a halogenating agent such as bromine, chlorine and the like and, when bromine is used, it has been found beneficial to add a trace of 48 percent hydrobromic acid to initiate the reaction. In general, any solvent which is substantially inert with respect to the reactants employed and in which the reagents are reasonably soluble may be used. Solvents which have proved to be particularly advantageous include acetic acid, chloroform, dioxane, diethyl ether, methylene chloride and the like. The reaction may be conducted at a temperature of from about 0° to 50° C. but in general, it is most convenient to conduct the synthesis at ambient temperature. The following equation illustrates this process:

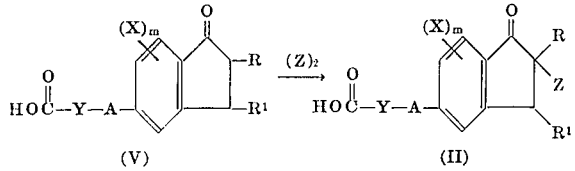

wherein A, Y, X, R, R¹, m and Z are as defined above.

The 5-hydroxy(or mercapto)inden-1-ones (III, infra) which are used as starting materials in the second method described above for preparing the products of the invention, i.e., the etherification process, are themselves diuretically active and are obtained by treating a suitable 2-halo-5-hydroxy(or mercapto)-1-indanone (VI, infra) with a dehydrohalogenating agent. The dehydrohalogenating agent is a base, preferably an organic base, such as 1,5-diazabicyclo-[4.3.0]-5-nonene, 1,5-diazabicyclo-[5.4.0]-undec-5-ene, pyridine, lutidine, collidine, triethylamine and the like. The reaction is generally carried out in dimethylsulfoxide or in dimethylformamide and preferably at ambient temperature or at temperatures slightly above ambient temperature. The following equation illustrates this process:

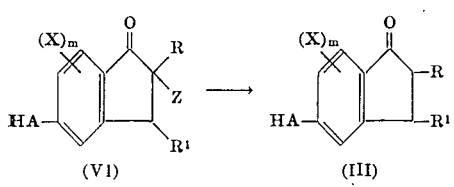

wherein A, X, R, R¹, m and Z are as defined above. Also, when R represents methyl the dehydrohalogenating agent employed may be, in addition to the bases given above, lithium bromide.

The [1-oxoinden-5-yloxy(or thio)]alkanoic acid esters (IV) which have been described above in connection with the third method for preparing the products of the invention are useful not only as chemical intermediates, but are themselves active as diuretics. The said esters may be prepared by one or more of two methods: (a) by the etherification of a 5-hydroxy(or mercapto)-inden-1-one (III) with a suitable haloalkanoic acid ester; or (b) by the dehydrobromination of a suitable [1-oxo-3-bromo-5-indanyloxy(or thio)]alkanoic acid ester (VIII, infra). The said etherification and dehydrobromination methods are discussed in greater detail below.

The etherification process (a) for preparing the said ester derivatives comprises reacting a haloalkanoic acid ester having the formula:

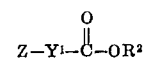

wherein R², Y¹ and Z are as defined above, with a suitable 5-hydroxy(or mercapto)inden-1-one (III, infra). The following equation illustrates this reaction:

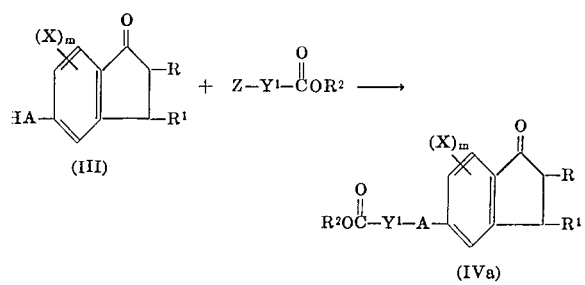

wherein the radicals A, X, R, R¹, R², Z and m are as defined above and Y¹ is a methylene or trimethylene radical which may be appropriately substituted by alkyl or an halo radical such as fluoro. It will be noted that inasmuch as the definition of the Y¹ radical is limited solely to methylene or trimethylene, which may be substituted by alkyl or fluoro, the [1-oxoinden-5-yloxy(or thio)]alkanoic acid esters produced by this process contain only a single carbon atom or, alternatively, three linear carbon atoms between the carbonyl and oxygen (or sulfur) groups of the ester derivative (IVa). In general, the reaction is conducted in the presence of a base such as potassium or sodium carbonate or sodium or potassium hydroxide or in the presence of a sodium alkoxide such as sodium ethoxide. The choice of a suitable reaction solvent is dependent largely upon the character of the reactants employed but, in general, any solvent which is substantially inert to the reactants and in which the reagents are reasonably soluble may be used. For example, ethanol and dimethylformamide have provided to be particularly advantageous solvents in which to conduct the reaction. The process may be carried out at ambient temperatures but, generally, it is desirable to conduct the process at temperatures above ambient temperatures.

The dehydrobromination process (b) for preparing the ester derivatives involves the reaction of [1-oxo-3-bromo-5-indanyloxy(or thio)]alkanoic acid ester (VII, infra) with a base, preferably an organic base such as 1,5-diazabicyclo[4.3.0]-5-nonene, 1,5-diazabicyclo[5.4.0]-undec-5-ene, pyridine and the like. Any solvent which is substantially inert to the reactants an in which the reagents are reasonably soluble may be used such as dimethylsulfoxide, dimethylformamide, and the like. The reaction may be conducted at a temperature of from about 0° to about 150° C. for a period of 1 to about 8 hours; however, in most instances, the reaction is conveniently out at ambient temperature for a period of about 1 hour. The following equation illustrates this reaction:

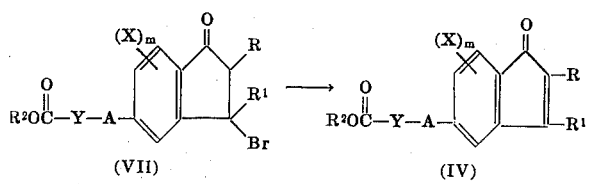

wherein A, Y, R, R¹, R², X and m are as defined above.

The [1-oxo-5-indanyloxy(or thio)]alkanoic acids (V, infra) which are employed as intermediates in the preparation of the [1-oxo-2-halo-5-indanyloxy(or thio)]alkanoic acids (II, supra) are themselves diuretically active and are prepared by one of two alternate processes by (a) cyclialkylation of the appropriate [4-(2-alkylideneacyl)phenoxy(or phenylthio)]alkanoic acid (VIII, infra) using a Friedel-Crafts type catalyst such as concentrated sulfuric acid, polyphosphoric acid, hydrofluoric acid, aluminum chloride, fluorosulfonic acid and the like. The reaction may be conducted at ambient temperatures but, generally, it is desirable to conduct the reaction at temperatures above ambient temperature. The following equation illustrates this process:

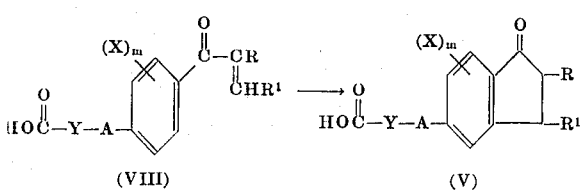

wherein A, Y, R, R¹, X and m are as defined above or, alternatively (b) by reacting a 5-hydroxy(or mercapto)-1-indanone (IX, infra) with a haloalkanoic acid of the formula: Z—Y¹—COOM, wherein Z, Y¹ and M are as defined above. It will be noted that inasmuch as the definition of the Y¹ radical is limited solely to methylene or trimethylene which may be substituted by alkyl or fluoro the [1-oxo-5-indanyloxy(or thio)]alkanoic acids (Va) produced by this process contain only a single carbon atom or, alternatively, three linear carbon atoms between the carbonyl and oxygen (or sulfur) groups of the product (Va). The reaction is usually conducted in a di-lower alkyl ketone such as acetone and the like with a base such as potassium carbonate and the like. The reaction is conveniently conducted at the reflux temperature of the particular solvent being used. The following equation illustrates this process:

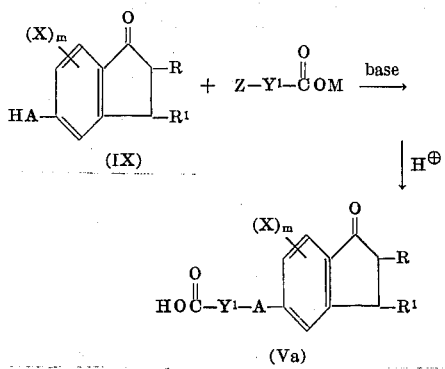

wherein A, X, Y¹, R, R¹, Z, M, m and H⊕ are as defined above.

The 2-halo-5-hydroxy(or mercapto)-1-indanones (VI) which are intermediates in the preparation of the 5-hydroxy-(or mercapto)inden-1-ones are themselves diuretically active and are prepared by the halogenation of the appropriate 5-hydroxy(or mercapto)-1-indanone (IX) with a halogenating agent such as bromine, chlorine and the like. When bromine is used, a catalytic amount of 48 percent hydrobromic acid is added to initiate the reaction. Suitable reaction solvents may be employed but acetic acid has proved to be a particularly advantageous reaction medium. Also, the reaction may be conveniently conducted at ambient temperature. The following equation illustrates the process:

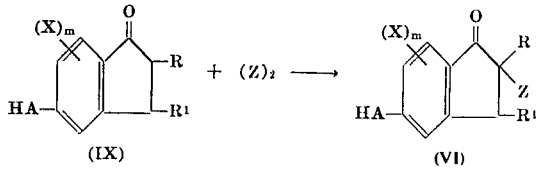

wherein A, X, R, R¹, m and Z are as defined above.

The [1-oxo-3-bromo-5-indanyloxy(or thio)]alkanoic acid esters (VII, infra) which are intermediates in the preparation of the ester derivatives of [1-oxoinden-5-yloxy(or thio)]alkanoic acids (IV, supra) may be prepared by the reaction of an ester derivative of a [1-oxo-5-indanyloxy(or thio)]-alkanoic acid (X, infra) with N-bromosuccinimide in a suitable organic solvent such as carbon tetrachloride. The following equation illustrates this process:

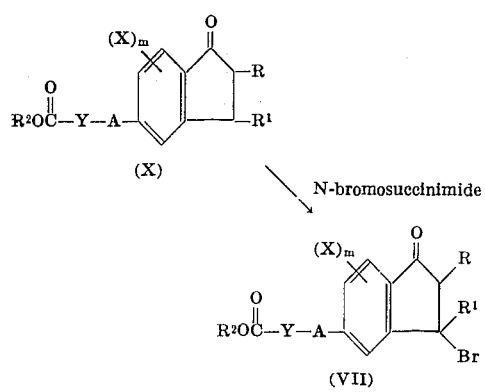

wherein A, Y, X, R, R¹, R² and m are as defined above.

The 5-hydroxy(or mercapto)-1-indanones (IX, infra) which are used as intermediates in the preparation of the 2-halo-5-hydroxy(or mercapto)-1-indanones (VI, supra) may be prepared by the cyclialkylation of a 4-(2-alkylideneacyl)-phenol(or thiophenol) (XII, infra) using a Friedel-Crafts type catalyst such as concentrated sulfuric acid, polyphosphoric acid and the like. The reaction may be conducted at ambient temperatures but, generally, it is desirable to conduct the reaction at temperatures above ambient temperatures. The following equation illustrates this process:

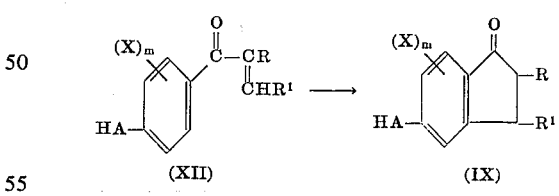

wherein A, X, R, R¹ and m are as defined above.

The ester derivative of [1-oxo-5-indanyloxy(or thio)]alkanoic acid (Xa, infra) which are used in the preparation of the [1-oxo-3-bromo-5-indanyloxy(or thio)]alkanoic acid ester derivatives (VII, supra) may be prepared by one or more of two alternate processes (a) by the reaction of 5-hydroxy(or mercapto)-1-indanone (IX, infra) with a halo-alkanoic acid ester derivative of the formula:

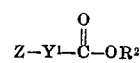

wherein Z, Y¹ and R² are as described above or (b) by esterifying the [1-oxo-5-indanyloxy(or thio)]alkanoic acids (V, infra) in the conventional manner. The etherification process (a) is conducted in a manner similar to that described above for the etherification of the 5-hydroxy(or mercapto)inden-1-ones (III, supra). Again it will be noted that inasmuch as the definition of the Y¹ radical is limited solely to methylene or trimethylene which may be substituted by alkyl or fluoro, the

[1-oxo-5-indanyloxy(or thio)]alkanoic acid esters (Xa) produced by this process contain only a single carbon atom, or alternatively, three linear carbon atoms between the carbonyl and oxygen (or sulfur) groups of the ester derivative. The reaction is conducted in the presence of a base such as potassium or sodium carbonate or potassium or sodium hydroxide or in the presence of a sodium alkoxide such as sodium ethoxide. Suitable reaction solvents may be employed but ethanol or dimethylformamide has proved to be a particularly advantageous reaction solvent. Also, the reaction may be conducted at ambient temperature but, generally, it is desirable to conduct the reaction at temperatures above ambient temperature. The following equation illustrates this process:

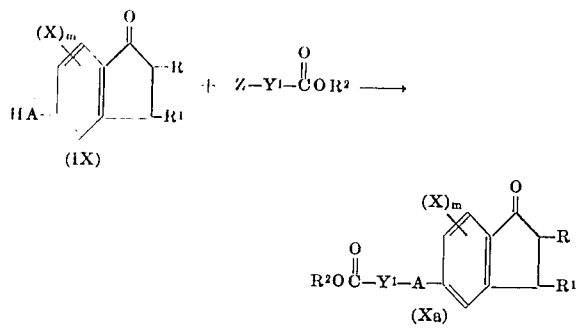

wherein A, X, R, $R^1$, $R^2$, Z, $Y^1$ and m are as defined above.

The esterification process (b) for preparing the ester derivatives of [1-oxo-5-indanyloxy(or thio)]alkanoic acids (X) comprises the reaction of an appropriate [1-oxo-5-indanyloxy(or thio)]alkanoic acid with an alkanol using a catalyst such as an inorganic acid or boron trifluoride and usually a solvent, such as an excess of the reactant alkanol. The following equation illustrates this reaction:

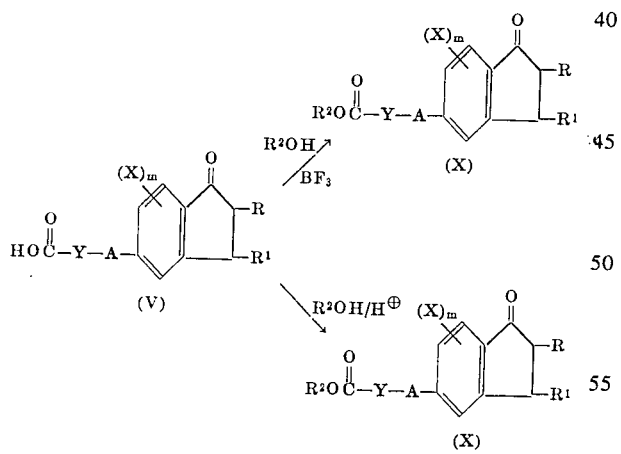

wherein A, Y, X, R, $R^1$, $R^2$, m and $H^\oplus$ are as defined above.

The [4-(2-alkylideneacyl)phenoxy(phenylthio)]-alkanoic acid intermediates (VIII, supra) are either known compounds or may be prepared by methods which are known to those skilled in the art. Thus, for example, the [4-(2-methyleneacyl)phenoxy(phenylthio)lH]alkanoic acids (VII infra) are prepared by treatment of a nuclear substituted [4-alkanoylphenoxy(or phenylthio)]alkanoic acid (XIII, infra) with a salt of a secondary amine as a di-lower alkylamine, or heterocyclic amine such as piperidine, morpholine and the like in the presence of formaldehyde or paraformaldehyde yields a Mannich base (XI, infra) which upon treatment with a weak base such as sodium bicarbonate either with or without heat or, alternatively, by heat alone gives the desired [4-(2-alkylideneacyl)phenoxy(phenylthio)]alkanoic acid (VIIIa, infra). The following equation illustrates this method:

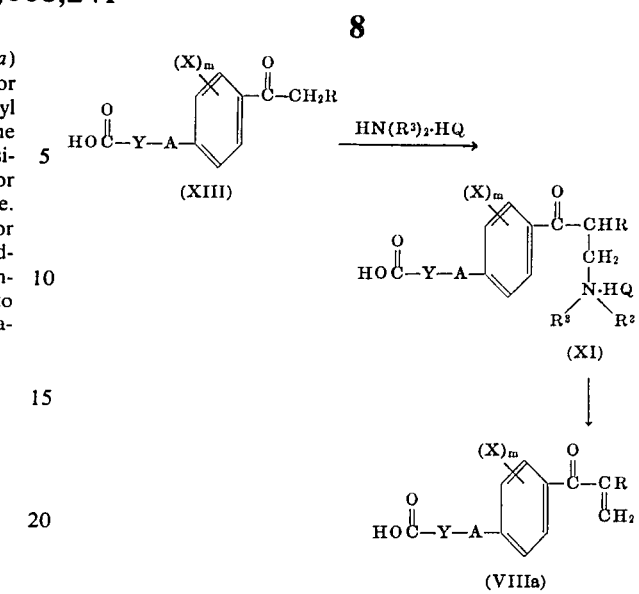

wherein A, Y, X, R, and m are as defined above and $R^3$ is lower alkyl such as methyl, ethyl, n-propyl and the like or both $R^3$ moieties may be joined to each other or through another hetero atom such as oxy to form one of the heterocycles recited above; HQ is the moiety derived from an inorganic acid capable of forming salts with amines, for example, hydrochloric acid and the like and $HN(R^3)_2 \cdot HQ$ is the salt of a secondary or heterocyclic amine.

The 4-(2-alkylideneacyl)phenol(or thiophenol) intermediates (XII, infra) are prepared by the Mannich reaction in a manner similar to that described above for the preparation of the [4-(2-alkylideneacyl)phenoxy(or phenylthio)]alkanoic acid derivatives (VIIIa, supra), i.e., by the reaction of an alkanoylphenol(or thiophenol) (XV, infra) with an appropriate secondary amine in the presence of formaldehyde or paraformaldehyde to form a Mannich base (XIV, infra) followed by treatment of the Mannich base with a weak base such as a sodium bicarbonate either with or without heat or, alternatively, with heat alone to give the desired 4-(2-alkylideneacyl)phenol(or thiophenol) (XII, infra). The following equation illustrates the process:

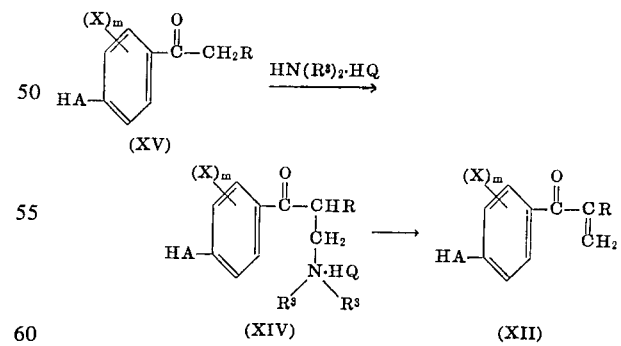

wherein A, X, R, $R^3$, m, HQ and $HN(R^3)_2 \cdot HQ$ are as defined above.

The nuclear substituted [4-alkanoylphenoxy(or phenylthio)]alkanoic acids (XIII, infra) which are intermediates in the preparation of the Mannich bases (XI, supra) and of the [4-(2-alkylideneacyl)phenoxy(or phenylthiol)]-alkanoic acids (VIII, supra) are either known or may be prepared by a variety of methods, but generally, the most advantageous route consists in the reaction of an alkanoyl halide with the appropriate phenoxy(or phenylthio)alkanoic acid in the presence of a Friedel-Crafts catalyst to produce the corresponding (4-alkanoylphenoxy or 4-alkanoylphenylthio)alkanoic acid (XIII, infra). The following equation illustrates the reaction:

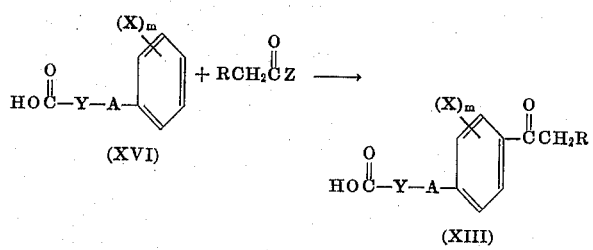

wherein A, R, Y, X, m and Z are as defined above. The Friedel-Crafts catalyst which has been found to be particularly suitable for this purpose is anhydrous aluminum chloride. The reaction solvent and the temperature at which the reaction is conducted are not particularly critical aspects of the reaction inasmuch as any solvent which is inert to the acid halide, phenoxy(or phenylthio)alkanoic acid and Friedel-Crafts catalyst may be employed with good results and the reaction temperature may be varied to obtain the desired rate of reaction. We have found, however, that carbon disulfide and petroleum ether are particularly suitable solvents in which to conduct the reaction and that the reaction proceeds most advantageously with slight heating as, for example, at the reflux temperature of the particular solvent being used.

The [1-oxoinden-5-yloxy) and (1-oxoinden-5-ylthio)]-alkanoic acids (I) of the invention are generally obtained as crystalline solids and, if desired, may be purified by recrystallization from a suitable solvent. Suitable solvents include, for example, acetic acid, nitromethane, benzene, 2-methoxyethanol and the like.

Included within the scope of this invention are the nontoxic, pharmacologically acceptable acid addition salts of the instant products. In general, any base which will form an acid addition salt with the foregoing [1-oxoinden-5-yloxy(and 1-oxoinden-5-ylthio)]alkanoic acids and whose pharmacological properties will not cause an adverse physiological effect when ingested by the body system is considered as being within the scope of this invention; suitable bases thus include, for example, the alkali metal and alkaline earth metal hydroxides, carbonates, and the like, ammonia, primary, secondary, and tertiary amines, such as mono-lower-alkylamines, di-lower-alkylamines, tri-lower-alkylamines, nitrogen containing heterocyclic amines, for example, piperidine, and the like.

Also included within the scope of this invention are the ester and amide derivatives of the instant products which are prepared by conventional methods well known to those skilled in the art. Thus, for example, the ester derivatives may be prepared by the reaction of a [1-oxoinden-5-yloxy(or thio)]alkanoic acid of this invention with an alcohol as, for example, with a lower alkanol. The amide derivatives of the [1-oxoinden-5-yloxy(and thio)]alkanoic acids of the invention may be prepared by converting a [1-oxoinden-5-yloxy(or thio)]-alkanoic acid to its corresponding acid chloride by treating said acid with thionyl chloride and then treating the acid chloride with ammonia or an appropriate mono-lower-alkylamine or di-lower-alkylamine to produce the corresponding amide compound. These and other equivalent methods for the preparation of the ester and amide derivatives of the instant products will be apparent to one having ordinary skill in the art and to the extent that said derivatives are both non-toxic and physiologically acceptable to the body system, said derivatives are the functional equivalent of the corresponding [1-oxoinden-5-yloxy-(and thio)]alkanoic acids.

The examples which follow illustrate the [1-oxoinden-5-yloxy-(and thio)]alkanoic acid products (I) of the invention and the methods by which they are prepared. However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

(1-Oxo-2-ethyl-6,7-dichloroinden-5-yloxy)acetic Acid

Step A: (1Oxo-2-ethyl-6,7-dichloro-5-indanyloxy)-acetic Acid

[2,3-Dichloro-4-(2-methylenebutyryl)phenoxy]acetic acid (100 g.) is added with stirring to concentrated sulfuric acid (95–98 percent, 500 ml.) and heated at 60° C. for 6 hours. The reaction mixture is cooled and poured into a mixture of ice and water (4 l.). The crude product which separates is ground in a mortar with water (500 ml.), filtered, washed with water and dried. After recrystallization from acetic acid (450 ml.) there is obtained 56 g. (56 percent) of (1-oxo-2-ethyl-6,7-dichloro-5-indanyloxy)acetic acid, m.p. 171°–172° C.

Elemental analysis for $C_{13}H_{12}Cl_2O_4$:

Calc.: C, 51.51; H, 3.99; Cl, 23.39;
Found: C, 51.91; H, 3.93; Cl, 23.30.

Step B: (1-Oxo-2-bromo-2-ethyl-6,7-dichloro-5-indanyloxy)acetic Acid

To a stirred suspension of (1-oxo-2-ethyl-6,7-dichloro-5-indanyloxy)acetic acid (30.3 g., 0.10 mole) in acetic acid (300 ml.) is added a solution of bromine (16.0 g., 0.10 mole) in acetic acid (50 ml.) over a period of 30 minutes. The reaction is catalyzed by the addition of 48 percent aqueous hydrobromic acid (2 drops). The clear yellow solution is stirred at room temperature for 30 minutes and then poured into ice water (1 l.) containing sodium bisulfite (2 g.). The product (36 g., 97 percent) is filtered, washed with water and dried. Recrystallization from a mixture of ethyl acetate and hexane yields (1-oxo-2-bromo-2-ethyl-6,7-dichloro-5-indanyloxy)-acetic acid, m.p. 189°–191° C.

Elemental analysis for $C_{13}H_{11}BrCl_2O_4$:

Calc.: C, 40.87; H, 2.90; Br, 20.92; Cl, 18.56;
Found: C, 41.21; H, 3.17; Br, 20.71; Cl, 18.38.

Step C: (1-Oxo-2-ethyl-6,7-dichloroinden-5-yloxy)-acetic Acid

A stirred solution of (1-oxo-2-bromo-2-ethyl-6,7-dichloro-5-indanyloxy)acetic acid (20.0 g., 0.0525 mole) in dimethyl sulfoxide (100 ml.) is treated with 1,5-diaza-bicyclo-[4.3.0]-5-nonene (14.2 g., 0.115 mole). The reaction mixture is stirred under a nitrogen atmosphere for 40 minutes, poured into water (1.5 l.) and acidified with concentrated hydrochloric acid (120 ml., 12 N.). Filtration yields 15.4 g. (98 percent) of (1-oxo-2-ethyl-6,7-dichloroinden-5-yloxy)acetic acid, m.p. 205°–207° C.

Elemental analysis for $C_{13}H_{10}Cl_2O_4$:

Calc.: C, 51.85; H, 3.35; Cl, 23.55;
Found: C, 51.93; H, 3.27; Cl, 23.45.

EXAMPLE 2

(1-Oxo-2-ethyl-6-chloroinden-5-yloxy)acetic Acid

Step A: (2-Chloro-4-butyrylphenoxy)acetic Acid

A 1 l. three-necked flask fitted with a stirrer, condenser and drying tube is charged with (o-chlorophenoxy)-acetic acid (37.2 g., 0.20 mole), carbon disulfide (400 ml.) and butyryl chloride (26.7 g., 0.25 mole). Aluminum chloride (86.9 g., 0.65 mole) is added to the reaction mixture over a one-hour period. The reaction mixture is stirred one hour at 25° C., 2 hours at 55° C. and then cooled. The carbon disulfide is decanted and the product is poured onto a mixture of ice (300 g.) and concentrated hydrochloric acid (50 ml., 12 N.). The product is extracted into ether, washed with water, dried over anhydrous magnesium sulfate and distilled at reduced pressure to yield 36 g. (71 percent) of crude (2-chloro-4-butyrylphenoxy)acetic acid, which after recrystallization from butyl chloride melts at 113°–114° C.

Elemental analysis for $C_{12}H_{13}ClO_4$:

Calc.: C, 56.15; H, 5.10; Cl, 13.81;
Found: C, 56.14; H, 5.13; Cl, 13.97.

Step B: [2-Chloro-4-[2-(dimethylaminomethyl)butyryl]-phenoxy]acetic Acid Hydrochloride (2-Chloro-4-butyrylphenoxy)acetic acid (12.8 g., 0.05 mole), paraformaldehyde (1.65 g., 0.055 mole) dimethylamine hydrochloride (4.62 g., 0.056 mole) and acetic acid (1 ml.) are combined and heated on a steam bath for three hours. The reaction mixture is treated with ethyl alcohol (75 ml.) and ether (125 ml.) which causes precipitation of 11.7 g. (69 percent) of crude [2-chloro-4-[2-(dimethylaminomethyl)butyryl]–phenoxy–acetic acid hydrochloride which after recrystallization from 2-propanol (90 ml.) melts at 182° C.

Elemental analysis for $C_{15}H_{21}Cl_2NO_4$:
Calc.:   C, 51.44; H, 6.04; N, 4.00;
Found:   C, 51.52; H, 6.11; N, 3.97.

Step C:   [2-Chloro-4-(2-methylenebutyryl)phenoxy]-acetic Acid

[2-Chloro-4-[2-dimethylaminomethyl)butyryl]phenoxy]-acetic acid hydrochloride (8.7 g., 0.025 mole), water (100 ml.), and saturated aqueous sodium bicarbonate (100 ml.) are combined and heated on a steam bath for 2 1/2 hours. The reaction mixture is acidified with hydrochloric acid (12 N.), extracted with ether and is dried over anhydrous magnesium sulfate. The ether is distilled at reduced pressure to yield 1.3 g. (20 percent) of [2-chloro-4-(2-methylene-butyryl)phenoxy]acetic acid which after recrystallization from methylcyclohexane (75 ml.) melts at 83.5-85.5° C.

Elemental analysis for $C_{13}H_{13}ClO_4$:
Calc.:   C, 58.11; H, 4.88; Cl, 13.20;
Found:   C, 57.80; H, 5.20; Cl, 13.00.

Step D:   (1-Oxo-2-ethyl-6-chloro-5-indanyloxy)acetic Acid (1-Oxo-2-ethyl-6-chloro-5-indanyloxy)acetic acid is prepared essentially by following the same procedure as described in Example 1, Step A, by using the following reagents:

[2-Chloro-4-(2-methylenebutyryl)-
phenoxy]acetic acid        41.32 g. (0.154 mole)
Conc. sulfuric acid         165 ml.

The (1-oxo-2-ethyl-6-chloro-5-indanyloxy)acetic acid is isolated as white prisms after recrystallization from benzene, m.p. 142°–144° C.

Elemental analysis for $C_{13}H_{13}ClO_4$:
Calc.:   C, 58.11; H, 4.88; Cl, 13.20;
Found:   C, 58.14; H, 4.76; Cl, 13.45.

Step E:   Methyl (1-Oxo-2-ethyl-6-chloro-5-indanyloxy)-acetate

A mixture of (1-oxo-2-ethyl-6-chloro-5-indanyloxy)-acetic acid (20.04 g., 0.0748 mole), methanol (600 ml.) and boron fluoride ethyl ether complex (60 ml.) is heated at reflux for 1 hour. The excess methanol is removed at reduced pressure and the oily residue is poured into cold water (400 ml.). The resulting solid is extracted with chloroform and the combined extracts are washed with a saturated sodium bicarbonate solution, then water and dried over anhydrous magnesium sulfate. The chloroform is removed under reduced pressure to give 21.2 g. of crude methyl (1-oxo-2-ethyl-6-chloro-5-indanyloxy)acetate, which after recrystallization from butyl chloride melts at 110°–111° C.

Elemental analysis for $C_{14}H_{15}ClO_4$:
Calc.:   C, 59.47; H, 5.35;
Found:   C, 59.86; H, 5.20.

Step F:   Methyl (1-Oxo-2-ethyl-6-chloroinden-5-yloxy)-acetate

To a solution of methyl (1-oxo-2-ethyl-6-chloro-5-indanyloxy)acetate (16.95 g., 0.060 mole) in carbon tetra-chloride (200 ml.) is added N-bromosuccinimide (11.32 g., 0.0636 mole) and α, α¹-azodi-isobutyronitrile (425 mg.). The mixture is heated at reflux for 10 minutes, cooled to room temperature and filtered to remove succinimide. The filtrate is washed with water and then dried over anhydrous magnesium sulfate. The solvent is removed under reduced pressure to give methyl (1-oxo-2-ethyl-3-bromo-6-chloro-5-indanyloxy)-acetate which is dissolved in pyridine (40 ml.) and heated at 80° C. for 30 minutes. The reaction solution is cooled to room temperature and poured into dilute hydrochloric acid (400 ml., 1.2 N.). The product is extracted with chloroform and the combined extracts are washed with water and dried over anhydrous magnesium sulfate. The solvent is removed under reduced pressure to give 16.8 g. of crude product. Recrystallization from methanol gives methyl (1-oxo-2-ethyl-6-chloroinden-5-yloxy)acetate, m.p. 116°–118° C.

Elemental analysis for $C_{14}H_{13}ClO_4$:
Calc.:   C, 59.90; H, 4.67; Cl, 12.63;
Found:   C, 60.31; H, 4.68; Cl, 12.85.

Step G:   (1-Oxo-2-ethyl-6-chloroinden-5-yloxy)acetic Acid

A mixture of methyl (1-oxo-2-ethyl-6-chloroinden-5-yloxy)acetate (5.73 g., 0.0205 mole), acetic acid (34 ml.) and dilute hydrochloric acid (5 percent, 17 ml.) is heated on a steam bath, with stirring, for 40 minutes. The reaction solution is cooled to room temperature and diluted with water. The resulting orange solid is collected and dried to yield 4.08 g. (75 percent) of crude product. Recrystallization from acetic acid gives (1-oxo-2-ethyl-6-chloroinden-5-yloxy)-acetic acid, m.p. 176°–178° C.

Elemental analysis for $C_{13}H_{11}ClO_4$:
Calc.:   C, 58.55; H, 4.16; Cl, 13.30;
Found:   C, 58.75; H, 4.49; Cl, 13.47.

EXAMPLE 3

(1-Oxo-2-ethyl-3-methyl-6,7-dichloroinden-5-yloxy)acetic Acid

Step A:   (1-Oxo-2-ethyl-3-methyl-6,7-dichloro-5-indanyloxy)acetic Acid

By following substantially the procedure described in Example 1, Step A, and using as the reactants [2,3-dichloro-4-(2-ethylidenebutyryl)phenoxy]acetic acid (22.5 g.) and concentrated sulfuric acid (88 ml.) there is obtained 14.5 g. (65 percent) of (1-oxo-2-ethyl-3-methyl-6,7-dichloro-5-indanyloxy)-acetic acid, which after recrystallization from nitromethane (75 ml.) melts at 167°–168° C.

Elemental analysis for $C_{14}H_{14}Cl_2O_4$:
Calc.:   C, 53.01; H, 4.45; Cl, 22.36;
Found:   C, 53.26; H, 4.36; Cl, 22.10.

Step B:   (1-Oxo-2-bromo-2-ethyl-3-methyl-6,7-dichloro-5-indanyloxy)acetic Acid

By following substantially the procedure described in Example 1, Step B, and using as the reactants (1-oxo-2-ethyl-3-methyl-6,7-dichloro-5-indanyloxy)acetic acid (31.7 g., 0.10 mole), bromine (16.0 g., 0.10 mole), acetic acid (400 ml.) and 48 percent aqueous hydrobromic acid (2 drops), there is obtained 39.7 g. (100 percent) of (1-oxo-2-bromo-2-ethyl-3-methyl-6,7-dichloro-5-indanyloxy)acetic acid which after recrystallization from ethyl acetate melts at 186° C.

Elemental analysis for $C_{13}H_{14}BrCl_2O_4$:
Calc.:   C, 42.45; H, 3.31; Br, 20.18; Cl, 17.90;
Found:   C, 42.50; H, 3.23; Br, 19.87; Cl, 17.64.

Step C:   (1-Oxo-2-ethyl-3-methyl-6,7-dichloroinden-5-yloxy)acetic Acid (1-Oxo-2-bromo-2-ethyl-3-methyl-6,7-dichloro-5-indanyloxy)acetic acid (30 g.) and pyridine (150 ml.) are combined and heated at reflux under a nitrogen atmosphere for 2 hours. The reaction mixture is poured into water (1.5 l.) containing concentrated hydrochloric acid (150 ml., 12 N.). The (1-oxo-2-ethyl-3-methyl-6,7-dichloroinden-5-yloxy)acetic acid which separates (17g., 71 percent) is conveniently purified by conversion to the ethyl ester followed by saponification according to Steps D and E.

Step D:   Ethyl (1-oxo-2-ethyl-3-methyl-6,7-dichloroinden-5-yloxy)acetate (1-Oxo-2-ethyl-3-methyl-6,7-dichloroinden-5-yloxy)acetic acid (5.5 g.), boron fluoride ethyl ether complex (9 ml.) and ethyl alcohol (150 ml.) are mixed and heated at reflux for one hour. The solution is cooled to precipitate the crude product, which is collected by filtration to yield 5.0 g. (83 percent) of ethyl (1-oxo-2-ethyl-3-methyl-6,7-dichloroinden-5-yloxy)acetate which after recrystallization from ethyl acetate (300 ml.) melts at 169°–171° C.

Elemental analysis for $C_{16}H_{16}Cl_2O_4$:
Calc.: C, 55.99; H, 4.70; Cl, 20.66;
Found: C, 55.82; H, 4.49; Cl, 20.75.

Step E: (1-Oxo-2-ethyl-3-methyl-6,7-dichloroinden-5-yloxy)acetic Acid

Ethyl (1-oxo-2-ethyl-3-methyl-6,7-dichloroinden-5-yloxy)acetate (3.5 g.), ethyl alcohol (600 ml.), a saturated aqueous sodium bicarbonate solution (100 ml.) and water (200 ml.) are combined and heated at reflux for 1 hour. The solution is filtered and acidified with concentrated hydrochloric acid (12 N.) to precipitate the product which is collected by filtration, washed with water and dried to yield 3.0 g. (94 percent) of (1-oxo-2-ethyl-3methyl-6,7-dichloroinden-5-yloxy)acetic acid, m.p. 246°–248° C.

Elemental analysis for $C_{14}H_{12}Cl_2O_4$:
Calc.: C, 53.35; H, 3.84;
Found: C, 53.30; H, 3.71.

EXAMPLE 4

(1-Oxo-methyl-6,7-dichloroinden-5-yloxy)acetic Acid

Step A: (1-Oxo-2-methyl-6,7-dichloro-5-indanyloxy)-acetic Acid

By following substantially the procedure described in Example 1, Step A, using as the reactants [2,3-dichloro-4-(2-methylenepropionyl)phenoxy]44 g.) and concentrated sulfuric acid (220 ml.) there is obtained 43 g. (98 percent) of crude product which is recrystallized from acetic acid (175 ml.) to yield (1-oxo-2-methyl-6,7-dichloro-5-indanyloxy)acetic acid, m.p. 203°–205° C.

Elemental analysis for $C_{12}H_{10}Cl_2O_4$:
Calc.: C, 49.85; H, 3.49; Cl, 24.53;
Found: C, 49.99; H, 3.72; Cl, 24.27.

Step B: Methyl (1-Oxo-2-methyl-6,7-dichloro-5-indanyl-oxy)acetate

By following substantially the procedure described in Example 2, Step E, and using as the reactants (1-oxo-2-methyl-6,7-dichloro-5-indanyloxy)acetic acid (28 g., 0.097 mole), anhydrous methanol (300 ml.) and boron fluoride ethyl ether complex (35 ml.), there is obtained 27 g. (92 percent) of methyl (1-oxo-2-methyl-6,7-dichloro-5-indanyloxy)acetate, m.p. 174°–176° C.

Step C: (1-Oxo-2-methyl-6,7-dichloroinden-5-yloxy)-acetic Acid

By following substantially the procedure described in Example 2, Step F, and using as the reactants methyl (1-oxo-2-methyl-6,7-dichloro-5-indanyloxy)acetate (21 g., 0.069 mole), carbon tetrachloride (500 ml.), N-bromo-succinimide (12.7 g., 0.0715 mole) and α,α¹-azodi-iso-butyronitrile (550 mg.) there is obtained 4.0 (15 percent) of crude methyl (1-oxo-2-methyl-3-bromo-6,7-dichloro-5-indanyloxy)acetate, which is reacted with pyridine (20 ml.) and then hydrolyzed by a procedure similar to that described in Example 2, Step G, using hydrochloric acid (5 percent, 7 ml.) and acetic acid (25 ml.) to give 1.2 g. (40 percent) of crude product, which, after recrystallization from nitromethane yields (1-oxo-2-methyl-6,7-dichloroinden-5-yloxy)acetic acid, m.p. 225°–227° C.

Elemental analysis for $C_{12}H_8Cl_2O_4$:
Calc.: C, 50.20; H, 2.81; Cl, 24.70;
Found: C, 49.98; H, 3.16; Cl, 25.04.

EXAMPLE 5

(1-Oxo-2-ethyl-7-bromoinden-5-yloxy)acetic Acid

Step A: (1-Oxo-2-ethyl-7-bromo-5-indanyloxy)acetic Acid

By following substantially the procedure described in Example 1, Step A, and using as the reactants [3-bromo-4-(2-methylenebutyryl)phenoxy]acetic acid (20 g., 0.064 mole) and concentrated sulfuric acid (90 ml.), there is obtained 8.7 g. (44 percent) of crude product which after recrystallization from acetic acid (75 ml.) yields (1-oxo-2-ethyl-7-bromo-5-indanyloxy)acetic acid, m.p. 146°–148° C.

Elemental analysis for $C_{13}H_{13}BrO_4$:
Calc.: C, 49.86; H, 4.18; Br, 25.52;
Found: C, 49.87; H, 4.29; Br, 25.38.

Step B: (1-Oxo-2-ethyl-7-bromoinden-5-yloxy)acetic Acid

A stirred suspension of (1-oxo-2-ethyl-7-bromo-5-indanyloxy)acetic acid (6.3 g., 0.02 mole) in acetic acid (50 ml.) is treated over a 10-minute period with bromine (3.2 g., 0.02 mole) in acetic acid (10 ml.). The reaction mixture is stirred at 25° C. for 0.5 hour and poured into water (400 ml.) containing sodium bisulfite (1 g.). The (1-oxo-2-ethyl-2,7-dibromo-5-indanyloxy)acetic acid is extracted with ether, washed with water, dried over anhydrous magnesium sulfate and the solvent is distilled at reduced pressure. The (1-oxo-2-ethyl-2,7-dibromo-5-indanyloxy)acetic acid, an oil, is dissolved in dimethyl-sulfoxide (30 ml.) treated with 1,5-diazabicyclo[4.3.0]-5-nonene, and stirred 0.75 hour at 25° C. The reaction mixture is poured into hydrochloric acid (300 ml., 1 N.) to yield 2.7 g. (43 percent) of crude (1-oxo-2-ethyl-7-bromoinden-5-yloxy)-acetic acid. Recrystallization from acetic acid (60 ml.) yields (1-oxo-2-ethyl-7-bromoinden-5-yloxy)acetic acid, m.p. 169°–171° C.

Elemental analysis for $C_{13}H_{11}BrO_4$:
Calc.: C, 50.18; H, 3.56; Br, 25.68;
Found: C, 50.22; H, 3.62; Br, 25.63.

EXAMPle 6

(1-Oxo-2-methyl-7-chloroinden-5-yloxy)acetic Acid

Step A: (1-Oxo-2-methyl-7-chloro-5-indanyloxy)acetic Acid

By following substantially the procedure described in Example 1, Step A, and using as the reactants [3-chloro-4-(2-methylenebutyryl)phenoxy]acetic acid (40 g.) and concentrated sulfuric acid (200 ml.) there is obtained 17 g. (42 percent) of (1-oxo-2-methyl-7 -chloro-5-indanyloxy)acetic acid which after recrystallization from nitromethane (200 ml.) melts at 170°–172° C.

Elemental analysis for $C_{12}H_{11}ClO_4$:
Calc.: C, 56.59; H, 4.35; Cl, 13.92;
Found: C, 56.40; H, 4.33; Cl, 13.78.

Step B: (1-Oxo-2-bromo-2-methyl-7-chloro-5-indanyloxy)-acetic Acid

By following substantially the procedure described in Example 1, Step B, and using as the reactants (1-oxo-2-methyl-7-chloro-5-indanyloxy)acetic acid (13.7 g., 0.054 mole), bromine (8.65 g., 0.054 mole), acetic acid (150 ml.) and 48 percent aqueous hydrobromic acid (2 drops) there is obtained (1-oxo-2-bromo-2-methyl-7-chloro-5-indanyloxy)acetic acid.

Step C: (1-Oxo-2-methyl-7-chloroinden-5-yloxy)acetic Acid

The (1-oxo-2-methyl-2-bromo-7-chloro-5-indanyloxy)-acetic acid (3.81 g., 0.015 mole) is dissolved in dimethyl-formamide (20 ml.) treated with lithium bromide (2.60 g., 0.03 mole) and heated on a steam bath under an atmosphere of nitrogen for 1 ½ hours. The reaction mixture is poured into water (150 ml.) and the (1-oxo-2-methyl-7-chloroinden-5-yloxy)acetic acid which separates (1.9 g., 61 percent) is filtered, rinsed with water and dried. After recrystallization from benzene (150 ml.) the (1-oxo-2-methyl-7-chlorinden-5-yloxy)acetic acid melts at 182°–184° C.

Elemental analysis for $C_{12}H_9ClO_4$:
Calc.: C, 57.04; H, 3.59; Cl, 14.03;
Found: C, 57.10; H, 3.76; Cl, 14.24.

EXAMPLE 7

(1-Oxo-2-ethyl-6,7-dichloroinden-5-yloxy)acetic Acid

Step A: 2-Ethyl-5-hydroxy-6,7-dichloro-1-indanone

By following substantially the procedure described in Example 1, Step A, and using as the reactants 2,3-dichloro-4-(2-methylenebutyryl)phenol (18 g.) and concentrated sulfuric acid (76 ml.) there is obtained 11.8 g. (66 percent) of 2-ethyl-5-hydroxy-6,7-dichloro-1-indanone, which after recrystallization from methanol (300 ml.) melts at 237°-239° C.

Elemental analysis for $C_{11}H_{10}Cl_2O_2$:
Calc.: C, 53.90; H, 4.11; Cl, 28.93;
Found: C, 53.82; H, 4.08; Cl, 28.87.

Step B: 2-bromo-2-ethyl-5-hydroxy-6,7-dichloro-1-indanone

A suspension of 2-ethyl-5-hydroxy-6,7-dichloro-1-indanone (3.92 g., 0.016 mole) in acetic acid (40 ml.) and 48 percent aqueous hydrobromic acid (2 drops) is treated with a solution of bromine (0.89 ml.) in acetic acid (10 ml.) over a 10-minute period. (Slight warming was necessary to initiate the reaction.) 2-Bromo-2-ethyl-5-hydroxy-6,7-dichloro-1-indanone precipitates and after standing for 1 hour is collected, rinsed with acetic acid and dried. Recrystallization from methanol (100 ml.) yields 2.7 grams of 2-bromo-2-ethyl-5-hydroxy-6,7-dichloro-1-indanone, m.p. 207°-210° C.

Elemental analysis for $C_{11}H_9BrCl_2O_2$:
Calc.: C, 40.77; H, 2.80; Br, 24.66; Cl, 21.88;
Found: C, 41.03; H, 2.93; Br, 24.22; Cl, 21.63.

Step C: 2-Ethyl-5-hydroxy-6,7-dichloroinden-1-one

A solution of 2-bromo-2-ethyl-5-hydroxy-6,7-dichloro-1-indanone (15 grams) and 1,5-diazabicyclo-[4.3.0]-5-nonene (5.8 ml.) in dimethyl sulfoxide (100 ml.) is heated for 40 minutes on a steam bath. The warm solution is then poured into a mixture of water (800 ml.) and concentrated hydrochloric acid (40 ml.) to precipitate crude 2-ethyl-5-hydroxy-6,7-dichloroinden-1-one which is collected by filtration, washed with water and dried. Sublimation at 160° C./0.1 mm. followed by recrystallization from acetic acid yields 1.2 grams of 2-ethyl-5-hydroxy-6,7-dichloroinden-1-one, m.p. 223°-226° C.

Elemental analysis for $C_{11}H_8CL_2O_2$:
Calc.: C, 54.35; H, 3.32; Cl, 29.17;
Found: C, 54.14; H, 3.22; Cl, 29.05.

Step D: Ethyl (1-Oxo-2-ethyl-6,7-dichloroinden-5-yloxy)acetate

A mixture of 2-ethyl-5-hydroxy-6,7-dichloroinden-1-one (9.7 g., 0.04 mole), dimethylformamide (30 ml.), potassium carbonate (12.5 g., 0.09 mole) and ethyl bromoacetate (51 g., 0.09 mole) is stirred and heated on a water bath at 60° C. for 1 hour. The reaction mixture is poured into ice water (200 ml.) and extracted with ether (2 × 50 ml.). The ether extract is washed with water, dried over anhydrous magnesium sulfate and the ether removed at reduced pressure to yield ethyl (1-oxo-2-ethyl-6,7-dichloroinden-5-yloxy)acetate which after two recrystallizations from ethanol has a m.p. of 141°-143° C.

Elemental analysis for $C_{15}H_{14}Cl_2O_4$:
Calc.: C, 54.73; H, 4.29; Cl, 21.64.
Found: C, 54.71H, 4.12; Cl, 21.64.

Step E: (1-Oxo-2-ethyl-6,7-dichloroinden-5-yloxy)acetic Acid

A mixture of ethyl (1-oxo-2-ethyl-6,7-dichloroinden-5-yloxy)acetate (1.8 g.), saturated aqueous sodium bicarbonate (50 ml.), water (100 ml.) and ethanol (50 ml.) is heated at reflux for 1 hour. The solution is filtered, acidified with concentrated hydrochloric acid, and the (1-oxo-2-ethyl-6,7-dichloroinden-5-yloxy)acetic acid which separates is purified by recrystallization from nitromethane, m.p. 205°-207° C.

EXAMPLE 8

[1-Oxo-2-ethyl-5-(1H-benz[e]indenyloxy)]acetic Acid

Step A: [1-Oxo-2-ethyl-5-(2,3-dihydro-1H-benz[e]-indenyloxy)]acetic Acid

By following substantially the procedure described in Example 1, Step A, and using as the reactants [4-(2-methyl-enebutyryl)naphthyloxy]acetic acid (25 g.) and concentrated sulfuric acid (100 ml.) there is obtained 15.5 g. (62 percent) of [1-oxo-2-ethyl-5-(2,3-dihydro-1H-benz[e]indenyloxy)]acetic acid which after recrystallization from 2-ethoxyethanol (200 ml.) melts at 245°-247° C.

Elemental analysis for $C_{17}H_{16}O_4$:
Calc.: C, 71.82; H, 5.67;
Found: C, 71.55; H, 5.88.

Step B: [1-Oxo-2-bromo-2-ethyl-5-(2,3-dihydro-1H-benz-[e]indenyloxy]acetic Acid

To a stirred suspension of [1-oxo-2-ethyl-5-(2,3-dihydro-1H-benz[e]indenyloxy)]acetic acid in acetic acid is added a solution of bromine in acetic acid over a period of 30 minutes. The reaction is catalyzed by the addition of 48 percent aqueous hydrobromic acid (2 drops). The reaction mixture is poured into ice water containing sodium bisulfite whereupon [1-oxo-2-bromo-2-ethyl-5-(2,3-dihydro-1H-benz[e]-indenyloxy)]acetic acid precipitates.

Step C: [1-Oxo-2-ethyl-5-(1H-benz[e]indenyloxy)]acetic Acid

A stirred solution of [1-oxo-2-bromo-2-ethyl-5-(2,3-dihydro-1H-benz[e]indenyloxy)]acetic acid in dimethylsulfoxide (100 ml.) is treated with 1,5-diazabicyclo[4.3.0]-5-nonene. The reaction mixture is stirred under nitrogen atmosphere, poured into water and acidified with concentrated hydrochloric acid. Filtration of the suspension yields [1-oxo-2-ethyl-5-(1H-benz[e]indenyloxy)]acetic acid.

EXAMPLE 9

(1-Oxo-2-ethyl-6,7-dimethylinden-5-yloxy)acetic Acid

Step A: (1-Oxo-2-ethyl-6,7-dimethyl-5-indanyloxy)-acetic Acid

By following substantially the procedure described in Example 1, Step A, and using as the reactants [2,3-dimethyl-4-(2-methylenebutyryl)phenoxy]acetic acid (40 g.) and concentrated sulfuric acid (160 ml.) there is obtained 40 g. (100 percent) of (1-oxo-2-ethyl-6,7-dimethyl-5-indanyloxy)acetic acid, which after recrystallization from acetonitrile (1.6 l.) melts at 206° C.

Elemental analysis for $C_{15}H_{18}O_4$:
Calc.: C, 68.68; H, 6.92;
Found: C, 68.37; H, 6.95.

Step B: (1-Oxo-2-bromo-2-ethyl-6,7-dimethyl-5-indanyl-oxy)acetic Acid

The (1-oxo-2-ethyl-6,7-dimethyl-5-indanyloxy)acetic acid is brominated by substantially the same procedure described in Example 1, Step B, to give (1-oxo-2-bromo-2-ethyl-6,7-dimethyl-5-indanyloxy)acetic acid.

Step C: (1-Oxo-2-ethyl-6,7-dimethylinden-5-yloxy)-acetic Acid

The (1-oxo-2-bromo-2-ethyl-6,7-dimethyl-5-indanyloxy)-acetic acid is dehydrohalogenated by substantially the same procedure described in Example 1, Step C, to give (1-oxo-2-ethyl-6,7-dimethylinden-5-yloxy)acetic acid.

EXAMPLE 10

(1-Oxo-2-ethyl-3,6,7-trimethylinden-5-yloxy)acetic Acid

Step A: (1-Oxo-2-ethyl-3,6,7-trimethyl-5-indanyloxy)-acetic Acid

By following substantially the procedure described in Example 1, Step A, and using as the reactants [2,3-dimethyl-4-(2-ethylidenebutyryl)phenoxy]acetic acid (1.5 g.) and concentrated sulfuric acid (7 ml.) there is obtained 0.7 g. (47 percent) of (1-oxo-2-ethyl-3,6,7-trimethyl-5-indanyloxy)acetic acid which after recrystallization from acetonitrile (10 ml.) melts at 141 -143° C.

Elemental analysis for $C_{16}H_{20}O_4$:
Calc.: C, 69.54; H, 7.29;
Found: C, 69.74; H, 7.11.

Step B: (1-Oxo-2-bromo-2-ethyl-3,6,7-trimethyl-5-indanyloxy)acetic Acid

The (1-oxo-2-ethyl-3,6,7-trimethyl-5-indanyloxy)-acetic acid is brominated by following substantially the procedure of Example 1, Step B, to yield (1-oxo-2-bromo-2-ethyl-3,6,7-trimethyl-5-indanyloxy)acetic acid.

Step C: (1-Oxo-2-ethyl-3,6,7-trimethylinden-5-yloxy)-acetic Acid

The (1-oxo-2-bromo-2-ethyl-3,6,7-trimethyl-5-indanyloxy)-acetic acid is dehydrohalogenated by following substantially the procedure of Example 1, Step B, to yield (1-oxo-2-ethyl-3,6,7-trimethylinden-5-yloxy)acetic acid.

EXAMPLE 11

(1-Oxo-2,3-dimethyl-6,7-dichloroinden-5-yloxy)acetic Acid

Step A: (1-Oxo-2,3-dimethyl-6,7-dichloro-5-indanyloxy)-acetic Acid

By following substantially the procedure described in Example 1, Step A, and using as the reactants [2,3-dichloro-4-(2-methylcrotonoyl)phenoxy]cetic acid (23 g.) and concentrated sulfuric acid (100 ml.) there is obtained 19.5 g. (85 percent) of (1-oxo-2,3-dimethyl-6,7-dichloro-5-indanyloxy)acetic acid, which after recrystallization from nitromethane (150 ml.) melts at 177°–179° C.

Elemental analysis for $C_{13}H_{12}Cl_2O_4$:
Calc.:     C, 51.51; H, 3.99; Cl, 23,39;
Found:    C, 51.55; H, 3.95; Cl, 23.19.

Step B: (1-Oxo-2-bromo-2,3-dimethyl-6,7-dichloro-5-indanyloxy)acetic Acid

The (1-oxo-2,3-dimethyl-6,7-dichloro-5-indanyloxy)-acetic acid is brominated by following substantially the procedure described in Example 1, Step B, to yield (1-oxo-2-bromo-2,3-dimethyl-6,7-dichloro-5-indanyloxy)acetic acid which after recrystallization from ethylene chloride has a m.p. of 191–193° C.

Elemental analysis for $C_{13}H_{11}BrCl_2O_4$:
Calc.:     C, 40.87; H, 2.90; Br, 20.92; Cl, 18.56;
Found:    C, 40.91; H, 3.08; Br, 20,79; Cl, 18.65.

Step C: (1-Oxo-2,3-dimethyl-6,7-dichloroinden-5-yloxy)acetic Acid

The (1-oxo-2-bromo-2,3-dimethyl-6,7-dichloro-5-indanyloxy)acetic acid is dehydrohalogenated by following substantially the procedure described in Example 7, Step C, to yield (1-oxo-2,3-dimethyl-6,7-dichloroinden-5-yloxy)-acetic acid which has a m.p. of 234°–236° C. after recrystallization from a mixture of ethanol and water.

Elemental analysis for $C_{13}H_{10}Cl_2O_4$:
Calc.:     C, 51.85; H, 3.35; Cl, 23.55;
Found:    C, 52.24; H, 3.42; Cl, 23.72.

EXAMPLE 12

(1-Oxo-2-cyclopentyl-6,7-dichloroinden-5-yloxy)acetic Acid

Step A: (1-Oxo-2-cyclopentyl-6,7-dichloro-5-indanyloxy)-acetic Acid

By following substantially the procedure described in Example 1, Step A, and using as the reactants [2,3-dichloro-4-(2-cyclopentylacryloyl)phenoxy]2.0 g.) and concentrated sulfuric acid (15 ml.), there is obtained 1.5 g. (75 percent) of (1-oxo-2-cyclopentyl-6,7-dichloro-5-indanyloxy)-acetic acid, which after recrystallization from nitromethane (10 ml.) melts at 183°–185° C.

Elemental analysis for $C_{16}H_{16}Cl_2O_4$:
Calc.:     C, 55.99; H, 4.70; Cl, 20.66;
Found:    C, 55.92; H, 4.81; Cl, 20.69.

Step B: (1-Oxo-2-bromo-2-cyclopentyl-6,7-dichloro-5-indanyloxy)-acetic Acid

The (1-oxo-2-cyclopentyl-6,7-dichloro-5-indanyloxy)-acetic acid is brominated by following substantially the procedure described in Example 1, Step B, to yield (1-oxo-2-bromo-2-cyclopentyl-6,7-dichloro-5-indanyloxy)acetic acid.

Step C: (1-Oxo-2-cyclopentyl-6,7-dichloroinden-5-yloxy)acetic Acid

The (1-oxo-2-bromo-2-cyclopentyl-6,7-dichloro-5-indanyloxy)acetic acid is dehydrohalogenated by following substantially the same procedure as described in Example 1, Step C, to yield (1-oxo-2-cyclopentyl-6,7-dichloroinden-5-yloxy)acetic acid.

EXAMPLE 13

(1-Oxo-2-ethyl-4,6-dichloroinden-5-yloxy)acetic Acid

Step A: (1-Oxo-2-ethyl-4,6-dichloro-5-indanyloxy)-acetic Acid

Finely ground [2,6-dichloro-4-(2-methylenebutyryl)phenoxy]-acetic acid (2.0 g., 0.0066 mole) is added portionwise, over 30 minutes, to concentrated sulfuric acid (8 ml., 36 N.) at room temperature, employing good stirring. The resulting solution is allowed to stand at 50°–55° C. for 2 hours. The reaction solution is cooled to room temperature and added, dropwise, to ice water (40 ml.). The product is collected and dried to yield 1.95 g. (98 percent) of (1-oxo-2-ethyl-4,6-dichloro-5-indanyloxy)acetic acid. Recrystallization from butyl chloride gives (1-oxo-2-ethyl-4,6-dichloro-5-indanyloxy)-acetic acid as white needles, m.p. 151°–153° C.

Elemental analysis for $C_{13}H_{12}Cl_2O_4$:
Calc.:     C, 51.51; H, 3.99; Cl, 23.29;
Found:    C, 51.62; H, 4.29; Cl, 23.21.

Step B: (1-Oxo-2-bromo-2-ethyl-4,6-dichloro-5-indanyloxy)acetic Acid

The (1-Oxo-2-ethyl-4,6-dichloro-5-indanyloxy)acetic acid is brominated by following substantially the procedure as described in Example 1, Step B, to yield (1-oxo-2-bromo-2-ethyl-4,6-dichloro-5-indanyloxy)acetic acid.

Step C: (1-Oxo-2-ethyl-4,6-dichloroinden-5-yloxy)acetic Acid

The (1-oxo-2bromo-2-ethyl-4,6-dichloro-5-indanyloxy)-acetic acid is dehydrohalogenated by following substantially the procedure described in Example 1, Step C, to yield (1-oxo-2-ethyl-4,6-dichloroinden-5-yloxy)acetic acid.

EXAMPLE 14

(1-Oxo-2-ethyl-4,6,7-trimethylinden-5-yloxy)acetic Acid

Step A: (1-Oxo-2-ethyl-4,6,7-trimethyl-5-indanyloxy)-acetic Acid

Finely ground [2,3-6-trimethyl-4-(2-methylenebutyryl)-pheoxy]acetic acid (12.18 g., 0.044 mole) is added portionwise, over a period of 1 hour, to concentrate sulfuric acid (49 ml., 36 N.) at room temperature, employing good stirring. The resulting reddish-brown solution is kept at 0° C. for 6 days. The reaction solution is then added, dropwise, to ice water (245 ml.) and the product is collected and dried to yield 11.6 g. (96 percent) of (1-oxo-2-ethyl-4,6,7-trimethyl-5-indanyloxy)acetic acid, which melts at 136°–137° C. after recrystallization from butyl chloride.

Elemental analysis for $C_{16}H_{20}O_4$:
Calc.:     C, 69.54; H, 7.30;
Found:    C, 69.75; H, 7.14.

Step B: (1-Oxo-2-bromo-2-ethyl-4,6,7-trimethyl-5-indanyloxy)acetic Acid

The (1-oxo-2-ethyl-4,6,7-trimethyl-5-indanyloxy)acetic acid is brominated by following substantially the same procedure as described in Example 1, Step B, to yield (1-oxo-2-bromo-2-ethyl-4,6,7-trimethyl-5-indanyloxy) acetic acid.

Step C: (1-Oxo-2-ethyl-4,6,7trimethylinden-5-yloxy)-acetic Acid

The (1-oxo-2-ethyl-4,6,7-trimethyl-5indanyloxy)acetic acid is dehydrohalogenated by following substantially the same procedure as described in Example 1, Step C, to yield (1-oxo-2-ethyl-4,6,7-trimethylinden-5-yloxy)acetic acid.

EXAMPLE 15

(1-Oxo-2-cyclohexyl-6,7-dichloroinden-5-yloxy)acetic Acid

Step A: (1-Oxo-2-cyclohexyl-6,7-dichloro-5-indanyloxy)-acetic Acid

By following substantially the procedure described in Example 1, Step A, using as the reactant [2,3-dichloro-4-(2-cyclohexylacryloyl)phenoxy]2.2 g. ), there is obtained 2.2 g. (100 percent) of (1-oxo-2cyclohexyl-6,7-dichloro-5-indanyloxy)acetic acid which melts at 182°–184° C. after recrystallization from nitromethane (15 ml.).

Elemental analysis for $C_{17}H_{18}Cl_2O_4$:
Calc.:     C, 57.16; H, 5.08; Cl, 19.85;
Found:    C, 57.26; H, 4.82; Cl, 19.58.

Step B: (1-Oxo-2-bromo-2-cyclohexyl-6,7-dichloro-5-indanyloxy)acetic Acid

The (1-oxo-2-cyclohexyl-6,7-dichloro-5-indanyloxy)-acetic acid is brominated by following substantially the same procedure as described in Example 1, Step B, to yield (1-oxo-2-bromo-2-cyclohexyl-6,7-dichloro-5-indanyloxy)acetic acid.

Step C: (1-Oxo-2-cyclohexyl-6,7-dichloroinden-5-yloxy)-acetic Acid

The (1-oxo-2-bromo-2-cyclohexyl-6,7-dichloro-5-indanyloxy)acetic acid is dehydrohalogenated by following substantially the procedure as described in Example 1, Step C, to yield (1-oxo-2-cyclohexyl-6,7-dichloroiden-5-yloxy)-acetic acid.

EXAMPLE 16

(1-Oxo-2-ethyl-6,7-dichloroinden-5-yloxy)acetic Acid

2-Ethyl-5-hydroxy-6,7-dichloroinden-1-one (400 mg., 0.00165 mole) prepared as described in Example 7, Step C, is stirred and heated under reflux for 20 hours with a mixture of iodoacetic acid (372 mg., 0.002 mole), potassium carbonate (276 mg., 0.002 mole) and acetone (20 ml.). The acetone is removed at reduced pressure and the residual salt dissolved in water (20 ml.) and then acidified with dilute hydrochloric acid to precipitate the (1-oxo-2-ethyl-6,7-dichloroinden-5-yloxy)acetic acid, m.p. 205°–207° C.

EXAMPLE 17

(1-Oxo-2-ethyl-6,7-dichloroinden-5-yloxy)acetic Acid

Step A: Ethyl (1-Oxo-2-ethyl-6,7-dichloro-5-indanyloxy)acetate

A mixture of 2-ethyl-5-hydroxy-6,7-dichloro-1-indanone (9.8 g., 0.04 mole) (prepared as described in Example 7, Step A) dimethylformamide (30 ml.) potassium carbonate (12.5 g., 0.09 mole) and ethyl bromoacetate (15 g., 0.09 mole) is stirred and heated on a water bath at 60° C. for 1 hour. The reaction mixture is poured into ice water (200 ml.) and extracted with ether (2 × 50 ml.). The ether extract is washed with water, dried over magnesium sulfate and the ether distilled at reduced pressure. The ethyl (1-oxo-2-ethyl-6,7-dichloro-5-indanyloxy)acetate melts at 116°–118° C. after recrystallization from ethyl alcohol.

Elemental analysis for $C_{15}H_{16}Cl_2O_4$:
Calc.: C, 54.40; H, 4.87; Cl, 21.41;
Found: C, 54.45; H, 4.60; Cl, 21.51.

Step B: Ethyl (1-oxo-2-ethyl-6,7-dichloroinden-5-yloxy)acetate

The ethyl (1-oxo-2-ethyl-6,7-dichloro-5-indanyloxy)acetate is brominated and dehydrobrominated by following substantially the procedure of Example 2, Step F, to yield ethyl (1-oxo-2-ethyl-6,7-dichloroinden-5-yloxy)acetate.

Step C. (1-Oxo-2-ethyl-6,7-dichloroinden-5-yloxy)acetic Acid

The ethyl (1-oxo-2-ethyl-6,7-dichloroinden-5-yloxy)acetate is hydrolyzed by following substantially the procedure of Example 2, Step G. to yield (1-oxo-2-ethyl-6,7-dichloroinden-5-yloxy)acetic acid, m.p. 205°–207° C.

EXAMPLE 18

(1-Oxo-2-ethyl-6,7-dichloroinden-5-yloxy)acetic Acid

Step A. (1-Oxo-2-ethyl-2,6,7-trichloro-5-indanyloxy)-acetic Acid

To a stirred suspension of (1-oxo-2-ethyl-6,7-dichloro-5-indanyloxy)acetic acid (6.06 g., 0.02 mole) (prepared as described in Example 1, Step A) in glacial acetic acid (100 ml.) and conc. hydrochloric acid (2 drops) is added a solution of glacial acetic acid (50 ml.) and chlorine (1.56 g., 0.22 mole) over a period of 10 minutes. During the addition the reaction vessel is heated on a steam bath. After the addition is complete, the mixture is stirred without heating for 30 minutes and then poured into ice water (600 ml.). The white solid that separates is collected by filtration, washed with water and dried. The yield of product is 6.6 g., (98 percent) m.p. 185°–187° C. After recrystallization from acetic acid (25 ml.) the yield of (1-oxo-2-ethyl-2,6,7-trichloro-5-indanyloxy)acetic acid is 5.7 g., m.p. 185°–187° C.

Elemental analysis for $C_{13}H_{11}Cl_3O_4$:
Calc.: C, 46.25; H, 3.28; Cl, 31.51;
Found: C, 46.40; H, 3.63; Cl, 31.34.

Step B: (1-Oxo-2-ethyl-6,7-dichloroinden-5-yloxy)-acetic Acid

The (1-oxo-2-ethyl-2,6,7-trichloro-5-indanyloxy)acetic acid is dehydrohalogenated by following substantially the procedure described in Example 1, Step C, to yield (1-oxo-2-ethyl-6,7-dichloroinden-5-yloxy)acetic acid, m.p. 205°–207° C.

EXAMPLE 19

Sodium (1-Oxo-2-ethyl-6,7-dichloroinden-5-yloxy)acetate

To a solution of sodium bicarbonate (1.39 g., 0.0165 mole) in water (50 ml.) is added (1-oxo-2-ethyl-6,7-dichloroinden-5-yloxy)acetic acid (4.96 g., 0.0165 mole). The resulting solution is filtered and the solvent removed to yield sodium (1-oxo-2-ethyl-6,7-dichloroinden-5-yloxy)acetate.

EXAMPLE 20

(1-Oxo-2-ethyl-6,7-dichloroinden-5-yloxy)acetamide

Step A: (1-Oxo-2-ethyl-6,7-dichloroinden-5-yloxy)-acetyl Chloride

To a solution of (1-oxo-2-ethyl-6,7-dichloroinden-5-yloxy)acetic acid (6.02 g., 0.02 mole) in benzene (15 ml.) is added thionyl chloride (4.76 g., 0.04 mole). The mixture is heated at reflux for 1 hour. The solution is evaporated to dryness under reduced pressure. The residue is dissolved in benzene and again the solvent is removed at reduced pressure to yield crude (1-oxo-2-ethyl-6,7-dichloroinden-5-yloxy)-acetyl chloride substantially free of thionyl chloride.

Step B. (1-Oxo-2-ethyl-6,7-dichloroinden-5-yloxy)-acetamide

The (1-oxo-2-ethyl-6,7-dichloroinden-5-yloxy)acetyl chloride is chilled and to it is added chilled ammonium hydroxide (conc., 50 ml.). The resulting solid is collected and dried to yield (1-oxo-2-ethyl-6,7-dichloroinden-5-yloxy)-acetamide.

In a manner similar to that described in Example 1, Steps A–C, supra, for the preparation of (1-oxo-2-ethyl-6,7-dichloroinden-5-yloxy)acetic acid, all of the (1-oxoinden-5-yloxy)- and (1-oxoinden-5-ylthio)alkanoic acid products (I) described in the following table may be obtained. Thus, by substituting the appropriate [4-(2-alkylideneacyl)phenoxy(or phenylthio)]alkanoic acid for the [2,3-dichloro-4-(2-methylenebutyryl)phenoxy]acetic acid recited in Example 1, Step A, and following substantially the procedure described therein and in Steps B and C of that example, the corresponding [(1-oxoinden-5-yloxy) (or thio)]alkanoic acid products (I) may be obtained. The following equation illustrates the reaction of Example 1, Steps A, B and C and, together with Table I, depict the manner in which the [4-(2-alkylideneacyl)phenoxy(or phenylthio)]alkanoic acid reactants may be converted to their corresponding [(1-oxoinden-5-yloxy)(or thio)]alkanoic acid products

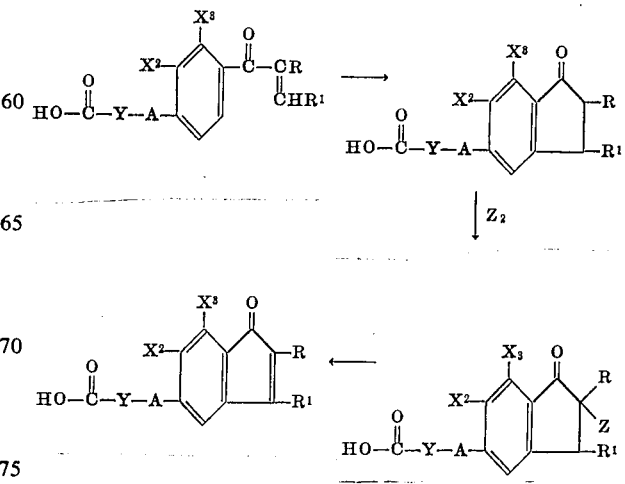

(I) may be obtained. The following equation illustrates the reaction of Example 1, Steps A, B and C and, together with Table I, depict the manner in which the [4-(2-alkylideneacyl]phenoxy(or phenylthio)]alkanoic acid reactants may be converted to their corresponding [(1-oxoinden-5-yloxy)(or thio)]alkanoic acid derivatives:

form or to combine one or more of the compounds of this invention with other known diuretics and saluretics or with other desired therapeutic and/or nutrative agents in dosage unit form.

The following example is included to illustrate the preparation of a representative dosage form:

TABLE I

| Ex. | R | R¹ | X² | X³ | Z | A | Y |
|---|---|---|---|---|---|---|---|
| 21 | $C_2H_5-$ | H | Cl | Cl | Br | O | $-\underset{\underset{CH_3}{\mid}}{\overset{\overset{CH_3}{\mid}}{C}}-$ |
| 22 | $C_6H_5-$ | H | H | Cl | Cl | O | $-CH_2-$ |
| 23 | $C_2H_5-$ | H | H | F | Br | O | $-CH_2-$ |
| 24 | $CH_3CH_2CH_2-$ | H | Cl | Cl | Cl | O | $-CH_2-$ |
| 25 | $Cl-C_6H_4-CH_2-$ | H | H | Cl | Br | O | $-CH_2-$ |
| 26 | $CH_3-\underset{\underset{}{\mid}}{\overset{\overset{CF_3}{\mid}}{CH}}-$ | H | H | $CH_3-$ | Br | O | $-CH_2-$ |
| 27 | $C_2H_5-$ | H | H | $-NH\overset{\overset{O}{\parallel}}{C}CH_3$ | Br | O | $-CH_2-$ |
| 28 | $C_2H_5-$ | H | Cl | $CH_3-$ | Br | O | $-CH_2-$ |
| 29 | $C_2H_5-$ | H | Br | Cl | Cl | O | $-CH_2-$ |
| 30 | $C_2H_5-$ | H | H | I | Br | O | $-CH_2-$ |
| 31 | $C_6H_5-CH_2-$ | H | H | Cl | Br | O | $-CH_2-$ |
| 32 | $C_2H_5-$ | H | H | $CF_3-$ | Br | O | $-CH_2-$ |
| 33 | $CH_3-$ | H | H | Cl | Br | S | $-(CH_2)_2-$ |
| 34 | $CH_3-$ | H | H | $CH_3-$ | Br | S | $-CH_2-$ |
| 35 | $C_2H_5-$ | H | Cl | Cl | Br | S | $-CH_2-$ |
| 36 | $CH_3-$ | | Cl | H | Br | O | $-CH_2-$ |
| 37 | $C_2H_5-$ | H | $-CH_2CH_2CH_2CH_2-$ | | Br | O | $-CH_2-$ |
| 38 | $C_2H_5-$ | H | $-CH_2CH_2CH_2-$ | | Br | O | $-CH_2-$ |
| 39 | $C_2H_5-$ | H | H | Cl | Cl | O | $-CH_2-$ |
| 40 | $C_2H_5-$ | H | Cl | Cl | Br | O | $-\underset{\underset{C_2H_5}{\mid}}{CH}-$ |
| 41 | $C_2H_5-$ | H | Cl | Cl | Br | O | $-CHF-$ |
| 42 | $CH_3-$ | H | H | Cl | Br | O | $-(CH_2)_2-$ |
| 43 | $(CH_3)_2CH-$ | H | Cl | Cl | Br | O | $-CH_2-$ |
| 44 | $C_2H_5-$ | H | H | Cl | Cl | O | $-\underset{\underset{CH(CH_3)_2}{\mid}}{CH}-$ |

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range varying from 5 to 500 mg. The product is preferably administered in subdivided doses in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 50 milligrams of a [1-oxoinden-5-yloxy(or thio)]alkanoic acid (I) or a suitable acid addition salt, ester or amide derivative thereof, with 149 mg. of lactose and 1 mg. of magnesium stearate and placing the 200 mg. mixture into a NO. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage

EXAMPLE 45

Dry-filled capsules containing 50 mg. of active ingredient per capsule

Per capsule, mg.
(1-oxo-2-ethyl-6,7-dichloro-inden-5-yloxy) acetic acid ......................................... 50
Lactose ................................................. 149
Magnesium stearate ................................. 1

Capsule (size No. 1) ................................ 200

The (1-oxo-2-ethyl-6,7-dichloroinden-5-yloxyl)acetic acid is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the [1-oxoiden-5-yloxy(and thio)]alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

We claim:
1. A compound having the formula:

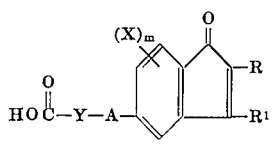

wherein R is lower alkyl; $R^1$ is hydrogen or lower alkyl; $X^1$ and $X^2$ represent similar or dissimilar members selected from hydrogen, halogen or lower alkyl with the proviso that $X^1$ and $X^2$ cannot both be hydrogen at the same time and when one of the $X^1$ or $X^2$ radicals is lower alkyl the other $X^1$ or $X^2$ radical is other than hydrogen and the nontoxic, pharmaceutically acceptable salts and ester derivatives thereof.

2. A compound according to claim 1 having the formula:

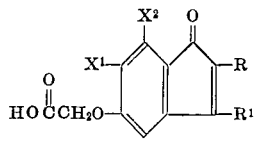

wherein Y is alkylene or haloalkylene having a maximum of four carbon atoms; A is oxygen; R is lower alkyl, cycloalkyl, mononuclear aryl, mononuclear aralkyl, halo substituted mononuclear aralkyl or trifluoromethyl lower alkyl; $R^1$ is hydrogen, lower alkyl or mononuclear aryl; the X radicals are similar or dissimilar members selected from halogen, lower alkyl, trifluoromethyl and $m$ is an integer having a value of 1 to 3 and when one of the X radicals is lower alkyl m has a value of 2 to 3 and the non-toxic, pharmaceutically acceptable salts and ester derivatives thereof.

3. The compound of claim 2 wherein $R^1$ is hydrogen and $X^1$ and $X^2$ represent halo.

4. The compound of claim 2 wherein R is ethyl, $R^1$ is hydrogen, and $X^1$ and $X^2$ are chloro.

5. The compound of claim 2 wherein $R^1$ is hydrogen, $X^1$ is hydrogen and $X^2$ is halo.

6. The compound of claim 2 wherein R is ethyl, $R^1$ is hydrogen, $X^1$ is hydrogen and $X^2$ is bromo.

7. The compound of claim 2 wherein R is ethyl; $R^1$ is hydrogen; $X^1$ is chloro and $X^2$ is hydrogen.

8. The compound of claim 2 wherein R is methyl; $R^1$ is hydrogen and $X^1$ and $X^2$ are chloro.

* * * * *

UNITED STATES PATENT OFFICE
CERTIFICATE OF CORRECTION

Patent No. 3,668,241   Dated June 6, 1972

Inventor(s) Edward J. Cragoe, Jr. & Otto W. Woltersdorf, Jr.

It is certified that error appears in the above-identified patent and that said Letters Patent are hereby corrected as shown below:

The definitions of Claims 1 and 2 as they appear in the issued patent are out of order. They should appear as follows:

1. A compound having the formula:

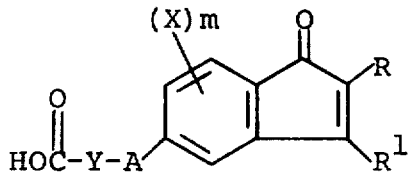

wherein Y is alkylene or haloalkylene having a maximum of four carbon atoms; A is oxygen; R is lower alkyl, cycloalkyl, mononuclear aryl, mononuclear aralkyl, halo-substituted mononuclear aralkyl or trifluoromethyl lower alkyl; $R^1$ is hydrogen, lower alkyl or mononuclear aryl; the X radicals are similar or dissimilar members selected from halogen, lower alkyl, trifluoromethyl and m is an integer having a value of 1 to 3 and when one of the X radicals is lower alkyl m has a value of 2 to 3 and the non-toxic, pharmaceutically acceptable salts and ester derivatives thereof.

2. A compound according to Claim 1 having the formula:

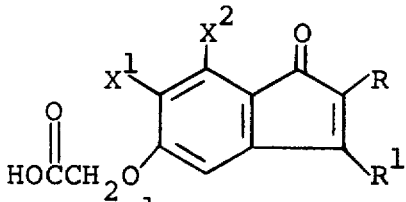

wherein R is lower alkyl; $R^1$ is hydrogen or lower alkyl; $X^1$ and $X^2$ represent similar or dissimilar members selected from hydrogen, halogen or lower alkyl with the proviso that $X^1$ and $X^2$ cannot both be hydrogen at the same time and when one of the $X^1$ or $X^2$ radicals is lower alkyl the other $X^1$ or $X^2$ radical is other than hydrogen and the nontoxic, pharmaceutically acceptable salts and ester derivatives thereof.

Signed and sealed this 20th day of March.1973.

(SEAL)
Attest:

EDWARD M. FLETCHER, JR.
Attesting Officer

ROBERT GOTTSCHALK
Commissioner of Patents